No. 696,653. Patented Apr. 1, 1902.
W. G. PRICE.
BRAKE FOR VEHICLES.
(Application filed July 13, 1899.)
(No Model.) 3 Sheets—Sheet 1.
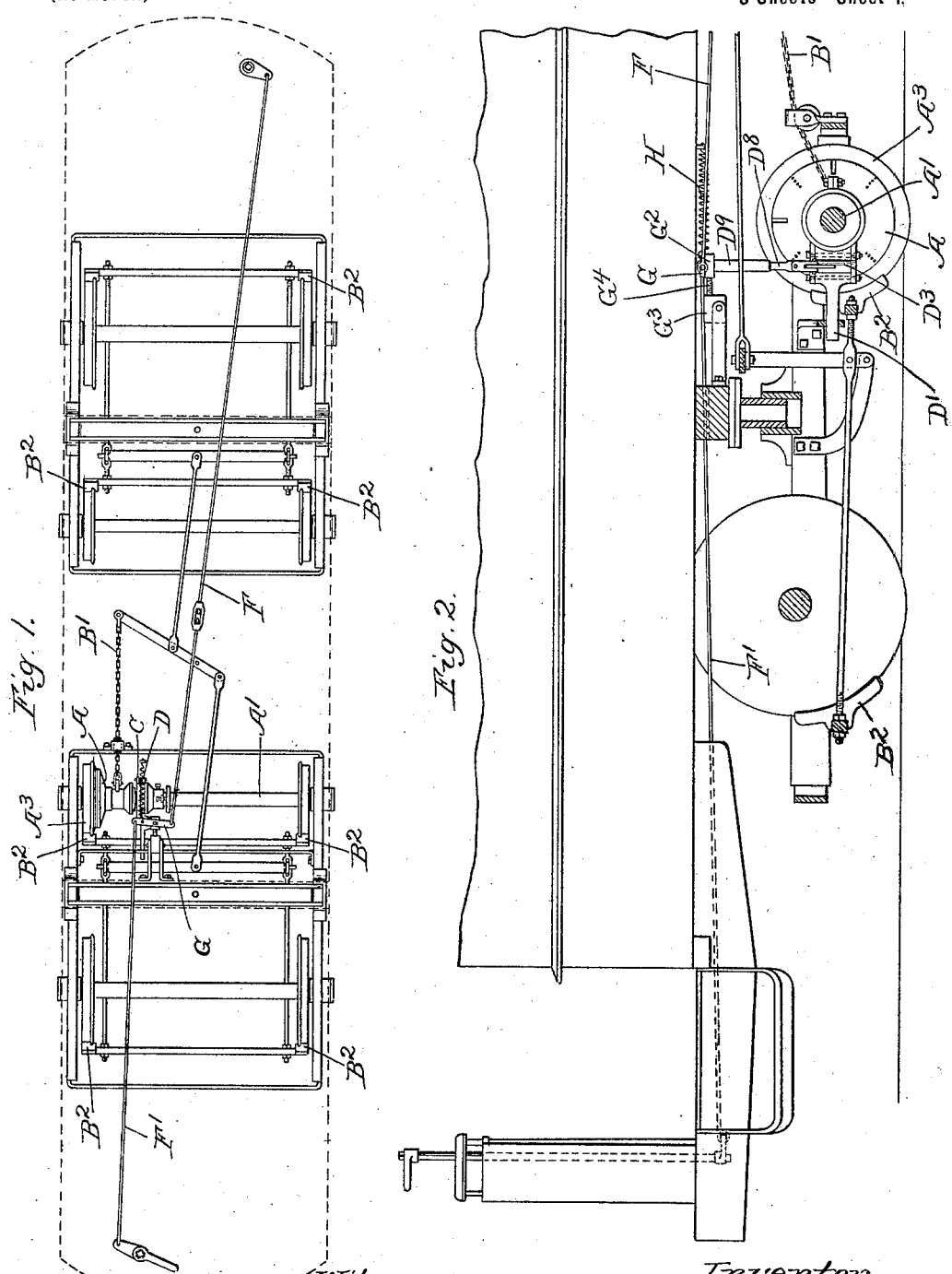

No. 696,653. Patented Apr. 1, 1902.
W. G. PRICE.
BRAKE FOR VEHICLES.
(Application filed July 13, 1899.)
(No Model.) 3 Sheets—Sheet 2.
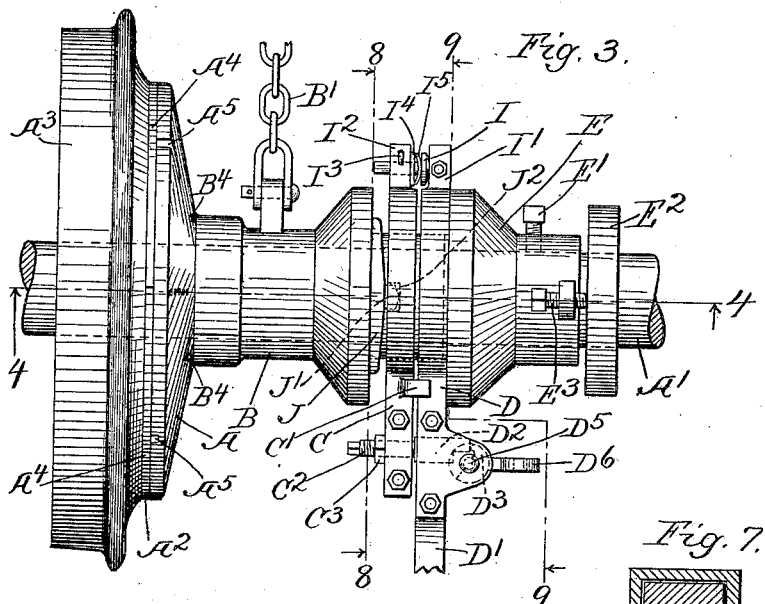
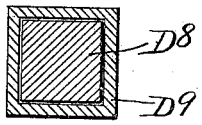
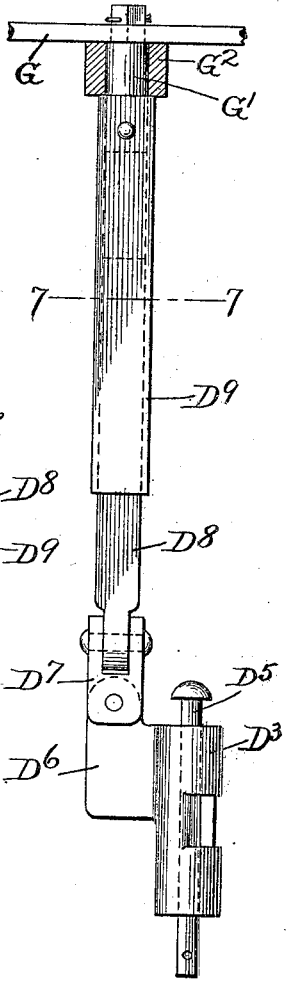
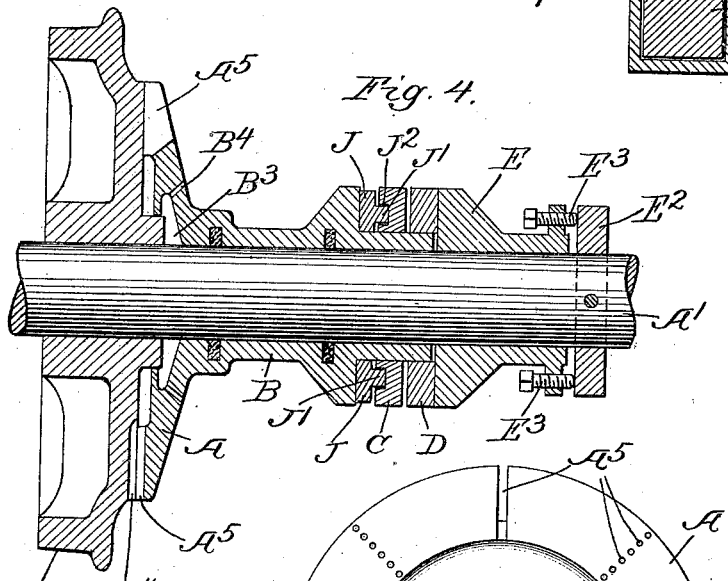
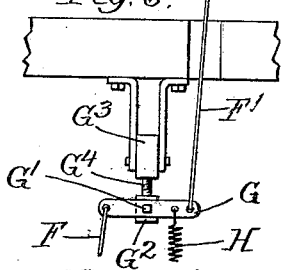
Witnesses.
Edward T. Wray.
Donald M. Carter.
Inventor.
William G. Price,
by Francis W. Parker
Atty.

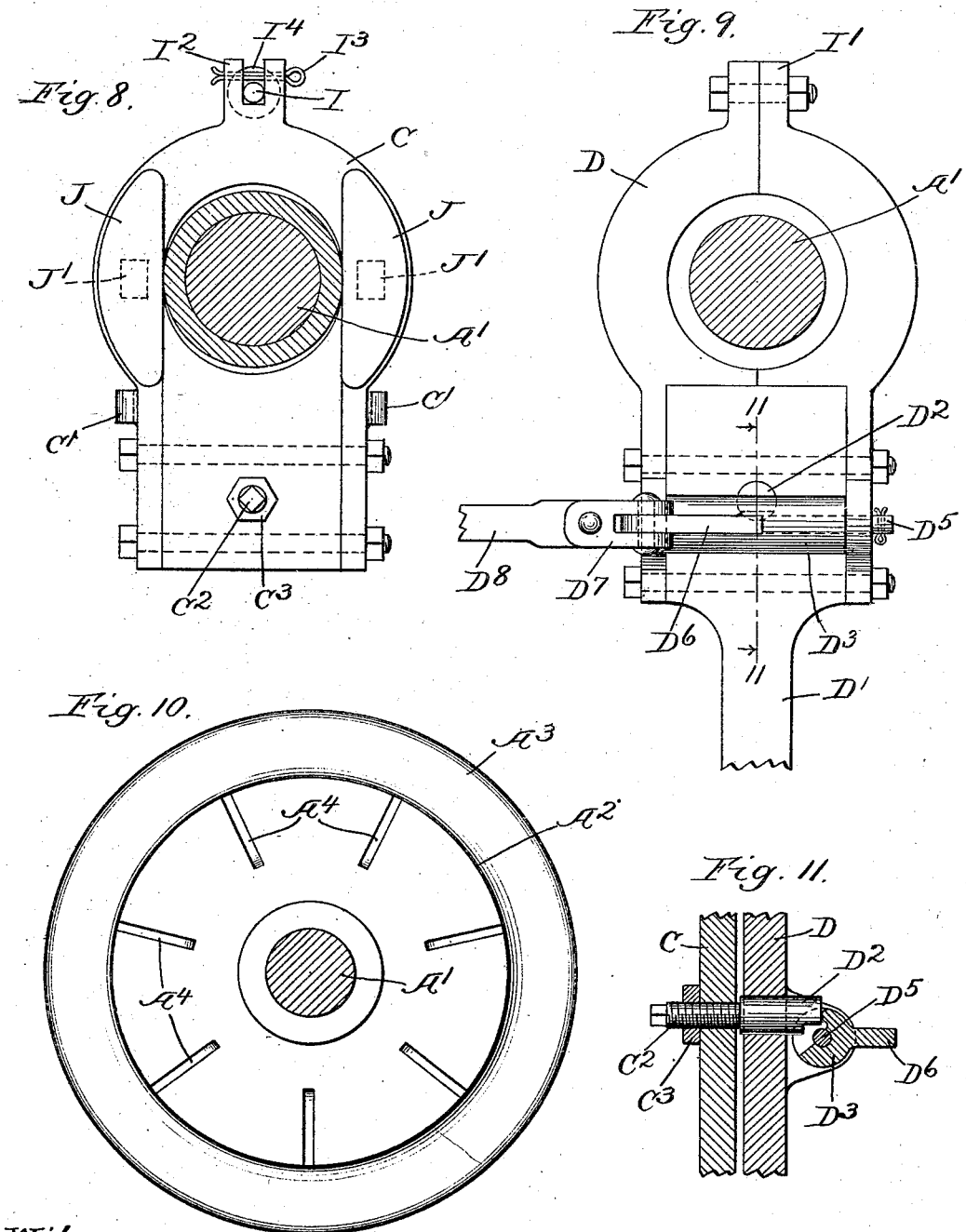

UNITED STATES PATENT OFFICE.

WILLIAM G. PRICE, OF KINGSTON, NEW YORK, ASSIGNOR TO COLUMBIA BRAKE & SUPPLY COMPANY, OF CHICAGO, ILLINOIS, A CORPORATION OF ILLINOIS.

BRAKE FOR VEHICLES.

SPECIFICATION forming part of Letters Patent No. 696,653, dated April 1, 1902.

Application filed July 13, 1899. Serial No. 723,657. (No model.)

*To all whom it may concern:*

Be it known that I, WILLIAM G. PRICE, a citizen of the United States, residing at Kingston, in the county of Ulster and State of New York, have invented a certain new and useful Improvement in Brakes for Vehicles, of which the following is a specification.

My invention relates to brakes for vehicles and the like, and has for its object to provide a new and improved brake of this description.

My invention is illustrated in the accompanying drawings, wherein—

Figure 1 is a plan view of a street-car truck having associated therewith a brake embodying my invention. Fig. 2 is an enlarged side view, with parts omitted and in part section, of a portion of the car and brake mechanism. Fig. 3 is an enlarged plan view of the mechanism on the car-axle. Fig. 4 is a section on line 4 4, Fig. 3. Fig. 5 is an enlarged view of the connection between the mechanism on the car-axle and the body of the car. Fig. 6 is a plan view looking down upon the lever-arms and showing the connection to the car-body. Fig. 7 is a section on line 7 7, Fig. 5. Fig. 8 is a section on line 8 8, Fig. 3. Fig. 9 is a section on line 9 9, Fig. 3. Fig. 10 is a view of the frictional or working face of the fixed part on the axle. Fig. 11 is a section on line 11 11, Fig. 9. Fig. 12 is a face view of one of the frictional elements, showing the openings or apertures therein.

Like letters refer to like parts throughout the several figures.

My present invention relates to brakes which utilize the movement or momentum of the car in setting the brake-shoes. In this class of brakes two frictional parts are used, one loosely mounted on the car-axle and the other rigidly attached thereto. One of these parts is connected to the brake-shoes by some suitable mechanism, and means are provided for bringing the two parts together, so that the frictional contact produces a movement of the mechanism and sets the brake-shoes. In the practical application of such brakes many difficulties have heretofore been met with. For example, in wet weather the water gets between the frictional parts and reduces the friction so as to prevent the proper and successful operation of the brake. Another difficulty is that the brake is applied unevenly during different relative positions of the frictional parts, so that the brake-shoes are alternately forced against the car-wheels and released or partially released therefrom as the car-axle rotates. As the brake mechanism must be on the car-axle and the operating-handle on the car-body, great difficulty has heretofore resulted from the lack of a suitable connecting device between the parts on the car-axle and the parts on the car-body. This difficulty is due to the fact that the car-body moves up and down with relation to the car-axle and also moves sidewise with relation thereto in going around curves and when the relative height of the rails varies. It has also been heretofore impossible to obtain a uniform application and graduated release of the brakes, so that the car could be stopped smoothly and with a uniform rate of retardation till the movement is nearly ended and then with a decreasing rate of retardation as the car comes to rest, so as not to give it a jerk. My invention obviates all these and many other evils heretofore accompanying the use of brakes which utilize the movement of the car in setting the brake-shoes.

Referring now to the accompanying drawings, wherein I have shown one construction embodying my invention, a friction device or disk A is loosely mounted on the car-axle A' and is opposed to a fixed part A² on the axle. This fixed part may be of any description and may be located at any part of the axle. In the drawings I have shown it as consisting of or associated with one of the wheels A³ of the car. When this construction is used, I prefer to form the fixed part so that it will have a free outer periphery or edge. This fixed part is provided with a series of openings, apertures, or grooves A⁴, which extend through or to the edge or periphery of the fixed part. Any number of these openings or grooves may be used and they may be of any size or form desired. When the fixed part is associated with the wheel or consists of a part of the wheel, these apertures or grooves may extend entirely through the wheel or may extend only part way therethrough, as shown. A series of similar openings or grooves A⁵ are made in the friction-disk A. When water or other material gets in between the friction-disk and the fixed part on the axle, it is conveyed to these apertures or grooves and then escapes without doing material harm and without affecting the proper operation of the brake. A sleeve B is connected with the friction-disk A and carries the chain or other flexible connection B', which connects the brake-shoes B² with the friction-disk. This connection may be made in any desired manner, and as it is no part of my present invention I have not described it in detail. The disk A is preferably provided with an oil-space B³, separated from the friction-space between the friction-disk and the fixed part on the axle, said oil-space adapted to collect the oil used in lubricating the parts and prevent it from entering the friction-space. Suitable openings or holes B⁴ are made in the friction-disk, so as to permit this oil to escape. Associated with the axle A' are two parts C and D, movable with relation to each other and interposed between the disk A and a suitable stop device E on the axle. This stop may be of any suitable description, and as herein shown consists of a movable collar adapted to be fixed in any desired position by means of the set-screw E'. A suitable compensating or adjusting device is interposed between the stop and the frictional device or part which permits automatic adjustment for inequalities in the construction, as will be hereinafter explained. A fixed piece or collar E² is connected with the axle, and the stop is adjusted along the axle by means of the screws E³, which bear against the piece E². The parts C and D may be of any desired construction. Said parts are preferably connected together at two points, and one of the parts is connected at two points with one of the devices between which they are interposed. These connections are preferably so arranged that the two points of connection between the parts C and D are on opposite sides of the axle and the two points of connection between one of the parts and the devices between which they are interposed are on opposite sides of the axle, the four connecting-points being substantially ninety degrees apart. These four points of connection constitute what may be termed "four points of pressure," and since they are substantially ninety degrees apart there is formed a gimbal or universal joint. Any suitable construction for obtaining these several connections may be used; and I have illustrated a particular construction which I have used with great success in the practical application of my brake to street-cars. In the construction shown the parts C and D surround or are supported upon the reduced end of the sleeve B, and the opening through the part C is made larger than the sleeve, (see Fig. 8,) so as to permit said part to move or oscillate with relation to the axle. The parts C and D are held in position in any desired manner. As shown in the drawings, the part D is provided with the projecting end D', which engages some suitable supporting-piece on the car, as shown in Fig. 1, and the part C is attached to the part D by means of the lugs C'. The parts C and D are connected together on one side of the axle by means of the bolt I, the head of which bears against the lugs I' on the part D, said bolt passing between the bifurcated end I² of the part C and being held in position by the pin I³. Interposed between the head of the bolt I and the part C are the washers I⁴ and I⁵, the washer I⁵ being preferably bent, as shown, so as to act in the nature of a spring, when desired. This construction forms a bearing-point or connection between the parts C and D at their ends. The other bearing-point or connection on the opposite side of the axle is formed by the operating mechanism. In the construction shown the part C is connected to the sleeve B, and hence the disk A, at two points, the connection being formed by the washers J J, which bear against the enlargement of the sleeve B, and which engage the part C by means of the projections J', which enter the openings J² in said part. Some suitable means is associated with the two parts C and D for separating them or moving them relatively, so as to force one toward the stop and the other toward the friction-disk, and thus move the disk into contact with the fixed part on the axle. As herein shown, a plunger or movable piece D² is connected with one of said parts and is adapted to engage the other, so that when moved the two parts may be separated. The piece D² is associated with the part D and preferably bears against an adjustable portion C² on the part C, which in this instance consists of a screw provided with a suitable lock-nut C³. The movable piece D² is moved by means of a cam D³, movably mounted between the lugs D⁴ and held in position by means of the bolt D⁵. The cam D³ is connected with suitable controlling devices F on the car, so that it may be moved in order to move the piece D². A proper connection between these controlling devices and the cam D³ is essential to the satisfactory operation of the brake. As herein shown, the cam D³ is provided with the projecting part D⁶, to which is connected a link D⁷. Said link is pivotally connected with the part D⁶, so as to be free to move in one direction, and is also pivotally connected to the rod D⁸, the two pivotal connections being substantially at right angles to each other, so as to form a universal joint and permit a universal movement between the parts. The rod D⁸ is movably connected with the lever-arms G, to which are connected the ropes or other flexible pieces F', leading to the controlling devices F on the car-body. The connection between the rod D⁸ and the lever-arms must be such as to permit relative movement, for the lever-arms are connected with the car-body and the rod with the parts associated with the car-axle. This result is obtained in the construction shown by forming the rod $D^8$ non-circular and inserting it part way in the sleeve $D^9$. This construction allows the reciprocation of the parts and at the same time permits the rod $D^8$ to be rotated or oscillated in order to operate the cam. The lever-arms G are connected to the sleeve $D^9$ by the piece G'. The parts are supported by the block $G^2$, which engages the piece G' and which is movably connected with the link $G^3$. This movable attachment is provided by means of the screw $G^4$. The link $G^3$ is movably connected with the car-body, the two connections being so arranged as to form a universal joint between the car-body and the sleeve $D^9$. A suitable retracting-spring H moves the parts back to their initial position when the controlling device is released.

I have described in detail one construction embodying my invention; but it is evident that the form, construction, and arrangement of the several parts may be varied and some of the parts omitted and others used with parts not herein shown without departing from the spirit of my invention. I therefore do not wish to be limited to the construction shown.

The openings, apertures, or grooves in the working face of the frictional parts may be of any description, the essential feature being that they communicate with the working surface and lead therefrom to some suitable outlet, so that water or any other material which gets between the frictional elements can pass through these openings or apertures so as to escape, and thus obviate any evil results upon the action of the brake. These openings or apertures may extend entirely through the frictional element or may consist simply of a series of holes, as shown in Fig. 12, or may consist of grooves which extend to the periphery, as shown in Fig. 10.

I have illustrated in Figs. 1 and 2 the ordinary car construction wherein the car-body is supported upon independent trucks pivotally connected thereto; but it is of course evident that my invention may be applied to cars of any other description, and I do not limit myself to such independent trucks.

The use and operation of my invention are as follows: When it is desired to set the brake, the controlling device at either end of the car is moved, so as to move the lever-arms G. This movement of the lever-arms causes the sleeve $D^9$ and the rod $D^8$ to rotate and moves the cam $D^3$ against the plunger $D^2$, so as to actuate said plunger. The movement of this plunger separates the parts C and D, and this separation of the parts forces the friction-disk A in contact with the fixed part on the axle. Said disk and the sleeve B are now rotated by this frictional contact with the moving part, and the chain or connection B' is wound upon the sleeve. Since said chain is connected with the brake-shoes, this winding upon the sleeve sets the brake-shoes against the wheels. If water or the like gets in between the friction-disk and the fixed part on the axle, it will be carried away by the slots or grooves, and hence will not obstruct the operation of the parts. When the brakes are being applied, the axle of the car is rotated, and hence the stop E, connected with the axle, is also rotated, so as to continually change the bearing-surface against which the part D bears. If now the part C has an extended bearing-surface, it will be seen that unless the two faces are perfectly true the pressure of the friction-disk A against its opposed surface will vary as the axle rotates, thus causing a varied application of the brake-shoes, so as to produce an uneven halting movement of the car before it is finally brought to a standstill. When the device herein shown is used, this objection is entirely obviated regardless of the trueness of the several faces of the parts, for there are four points of pressure at substantially ninety degrees from each other, two points being between the parts C and D and the other two points being between the part C and the friction-disk, the arrangement acting as a universal or gimbal joint. If now the face of the stop E is uneven, these four points of pressure allow a rocking movement of the parts C and D without varying the pressure exerted upon the friction-disk A, and hence a uniform application of pressure to the brake-shoes is obtained. This device also obviates the same uneven working of the brake-shoes when it was caused by either of the disk-surfaces A or $A^2$ not being normal to the axle. Since a portion of the brake mechanism is connected with the car-body, there is always relative movement between the parts due to the action of the springs and the sidewise movement of the car-body with relation to the truck. Since the sleeve $D^9$ is connected with the car-body by a universal joint, through the block $G^2$ and the link $G^3$, the relative movement of the car-body and truck is compensated for without affecting the operation of the mechanism, the rod $D^8$ moving up and down in the sleeve $D^9$ as the distance between the block $G^2$ and the cam $D^3$ varies. When this construction is used, there is very little friction between the parts, and hence only a small amount of force is required to operate the mechanism. A given pressure applied to the controlling device at either end of the car will produce substantially the same effect upon the brakes regardless of the direction in which the car is moving. This permits the operator on the car to judge the pressure exerted by the brake-shoes against the wheels and obviates flat wheels and other evils associated with the use of brakes where it is impossible to judge the pressure of the brake-shoes by the pressure applied to the controlling device.

I have shown the part C in the drawings as attached to the part D by means of suitable connecting devices; but it is of course evident that the part C may have a projecting end similar to that on the part D, which will engage some suitable supporting-piece, so as to prevent the rotation of said part. It will be noted that one of the parts interposed between the frictional element or disk and the fixed stop engages the parts between which it is interposed at four different points and may therefore be said to have four bearing-points. Two of these points are located on one side of the part and two on the other side of the part, the several points being substantially ninety degrees apart. This construction permits the rocking or moving of the interposed part in order to compensate for inequalities of the mechanism.

It will thus be seen that by means of my connection between the car-body and the mechanism on the axle and the four points of pressure of the controlling parts C and D the inequalities, variations, and imperfections of the several parts of the car and their connection together have no effect upon the proper operation of the brakes.

I claim—

1. A brake mechanism, comprising a part on the axle, an opposed frictional device, a stop device in proximity thereto, two parts interposed between said frictional device and said stop device, one of the parts engaging one device at two separated pivotal bearing-points and engaging the other part at two separated pivotal bearing-points, the several points disposed about the axle, so that said parts are free to rock about each other without varying the position of the friction device, substantially as described.

2. A brake mechanism, comprising a part fixed to the axle, an opposed frictional element, brake-applying devices operatively connected with said frictional element, a stop in proximity to said frictional element, an actuating device between the stop and the frictional element for moving said frictional element toward the fixed part, a compensating or adjusting device no part of the actuating device but interposed between the stop and said frictional part, which permits an automatic rocking upon axes approximately at right angles to each other, whereby automatic adjustment for inequalities in the construction is obtained.

3. A brake mechanism, comprising a part fixed to the axle, an opposed frictional part, brake-applying devices operatively connected with said frictional part, a stop in proximity to said frictional part, an actuating device between the stop and the frictional part for moving said frictional part toward the fixed part, a gimbal between the stop and the working face of the frictional part, and a movable part on the car for operating said actuating device, said gimbal having no effective function in moving said frictional part toward the fixed part, but effectively brought into action after the said frictional and fixed parts are in engagement.

4. A brake mechanism, comprising a part on the axle, an opposed frictional device, a stop device in proximity thereto, two parts interposed between said frictional device and said stop device, one of said parts having a rocking connection at two points with one device and at two differently-located points with the other part, so that said parts are free to rock about each other to adjust themselves to varying conditions and without varying the position of said frictional device, and means for moving said parts with relation to each other so as to move the frictional element.

5. A brake mechanism, comprising a part on the axle, an opposed frictional device, a stop device in proximity thereto, two parts interposed between said frictional device and said stop device, one of said parts having a rocking connection at two points with one device and at two differently-located points with the other part, thus forming four points of pressure, one of said latter connections comprising a movable piece working in one of said parts and engaging the other, and a controlling device connected with said movable piece so as to actuate it and separate the two parts.

6. A brake mechanism, comprising a part on the axle, an opposed frictional device, a stop device in proximity thereto, two relatively movable parts interposed between said frictional device and said stop device, one of said parts having a rocking connection at two points with one device and at two differently-located points with the other part, one of said latter connections comprising a movable piece working in one of said parts, a rotatable part engaging said movable piece, said rotatable part operatively connected with a controlling device by means of which the mechanism is operated.

7. A brake mechanism, comprising a part on the axle, an opposed frictional device, a stop device in proximity thereto, two parts interposed between said frictional device and said stop device, one of said parts having a rocking connection at two points with one device and at two differently-located points with the other part, one of said latter connections comprising a piece movably mounted on one of said parts, an opposed adjustable piece on the other part engaging said movable piece, and a controlling device to which said movable piece is connected.

8. A brake mechanism, comprising a part on the axle, an opposed frictional device, a stop device in proximity thereto, two parts interposed between said frictional device and said stop device, one of said parts having a rocking connection at two points with one device and at two differently-located points with the other part, said four points of connection being disposed about the axle substantially ninety degrees apart and adapted to permit a rocking motion of the movable parts when there are irregularities in the devices between which they are interposed without varying the position of said frictional device, and means for moving said two parts with relation to each other so as to move the frictional element to an operative position.

9. A brake mechanism, comprising a fixed element on the axle, a frictional element opposed thereto, two parts associated with said frictional element and interposed between it and a stop, a device for moving said parts relatively so as to force the frictional element against the fixed element on the axle, a controlling device on the vehicle-body and an automatic adjustable connection between said controlling device and the device for moving said parts.

10. A brake mechanism, comprising a fixed element on the axle, a frictional element opposed thereto, two parts associated with said frictional element and interposed between it and a stop, a device for moving said parts relatively so as to force the frictional element against the fixed element on the axle, a controlling device on the vehicle-body, a connection between said controlling device and the device for moving said parts, and a compensating device in said connection for compensating for the relative movement of the vehicle-body and the axle.

11. A brake mechanism, comprising a fixed element on the axle, a frictional element opposed thereto, two parts associated with said frictional element and interposed between it and a stop, a device for moving said parts relatively so as to force the frictional element against the fixed element on the axle, a controlling device on the vehicle-body, a connection between said controlling device and the device for moving said parts, two reciprocating parts interposed in said connection and adapted to reciprocate with relation to each other, said parts connected so as to rotate together.

12. A brake mechanism, comprising a fixed element on the axle, a frictional element opposed thereto, two parts on the axle and interposed between the frictional element and a stop, a device for moving one of said parts so as to force the frictional element against the fixed element on the axle, a controlling device on the vehicle-body, a connection between said controlling device and the device for moving said parts, two reciprocating parts interposed in said connection and adapted to reciprocate with relation to each other, said parts connected so as to rotate together, one of said parts having a universal connection with the controlling device and the other part having a universal connection with the device for moving the part on the axle so as to move the frictional element.

13. A brake mechanism, comprising an actuating device on the vehicle-axle, a controlling device on the vehicle-body, a connection between the actuating device and the controlling device, two parts interposed in said connection and free to reciprocate with relation to each other, but connected so as to move together when rocked about their axes.

14. A brake mechanism, comprising an actuating device on the vehicle-axle, a controlling device on the vehicle-body, a connection between the actuating device and the controlling device, two parts interposed in said connection and free to reciprocate with relation to each other, but connected so as to move together when rocked about their axes, one of said parts connected with the vehicle-body by a universal connection and a universal connection between the other part and said actuating device.

15. A brake mechanism, comprising two parts interposed between a stationary and a movable piece, a plunger associated with one part and bearing against the other part, a cam engaging said plunger and adapted to move it so as to separate the parts.

16. A brake mechanism, comprising two parts interposed between a stationary and a movable piece, a plunger associated with one part, an adjustable device on the other part which said plunger engages, a cam engaging said plunger and adapted to move it so as to separate the parts.

17. A brake mechanism, comprising a fixed element on the axle, a frictional element opposed thereto, two parts interposed between said frictional element and a stop on the axle, said parts provided on one side of the axle with means for separating them, a piece on the other side of the axle connected with one of said parts and bearing against the other, and one or more washers interposed between said piece and one of said parts, so as to hold the parts in their adjusted relative position.

18. A brake mechanism, comprising a fixed element on the axle, an opposed frictional element, two parts on said axle interposed between said frictional element and a stop associated with the axle, means for separating said parts located on one side of the axle and a connection or fulcrum between the parts on the other side of the axle.

19. A brake mechanism, comprising a fixed element on the axle, a frictional device opposed thereto, two parts interposed between said frictional device and a stop device on the axle, one part engaging the stop device and the other part, said other part engaging the frictional device, the several engagements forming pivotal connections, means for separating said two parts so as to move the frictional device against the fixed element on the car-axle, the engagement between said two parts and the stop and frictional element being such as to permit a rocking movement of said parts without moving the frictional device or varying the pressure with which the frictional element is forced against the fixed element on the axle.

20. A brake mechanism, comprising a fixed element on the axle, a frictional element opposed thereto, a stop on the axle, two parts interposed between said frictional element and said stop, said parts provided on one side of the axle with means for separating them, a bolt on the other side of the axle adjustably connected with one of said parts and bearing against the other, the position of said bolt adapted to be adjusted by means of one or more washers placed between the head of the bolt and the part with which it is connected, substantially as described.

21. A brake mechanism, comprising a fixed part on the axle, an opposed frictional element, a stop associated therewith, two parts on said axle interposed between said stop and said frictional element, one of said parts provided with a projecting arm which passes through an opening in a stationary part of the car, the other part provided with projecting lugs which engage the first-mentioned part, the construction arranged so as to prevent the two parts from rotating with the axle but permit relative movement between them.

22. A brake mechanism, comprising a fixed part on the axle, an opposed frictional device, a stop device on said axle, two parts mounted upon said axle and interposed between said stop device and frictional device, one of said parts connected at two points by a rocking connection with one device, the two parts connected together at two points substantially ninety degrees from said first-mentioned points, one or both of said parts provided with a projecting end which engages a part of the car so as to prevent the rotation of the parts with the axle.

23. A brake mechanism, comprising a fixed part on the axle, an opposed frictional device, a stop device associated therewith, two parts interposed between said frictional device and stop device, two pieces, one on each side of the axle, adapted to engage one of said devices, said pieces provided with projections received into openings in one of said parts, so as to carry the pressure when the parts are separated, a connection between said parts on each side of the axle, and means for separating said parts so as to move the frictional element in contact with the fixed part on the axle.

24. A brake mechanism, comprising a fixed part on the axle, an opposed frictional element, two parts mounted on said axle between said frictional element and a stop and suitably connected together, one of said parts provided with an enlarged or elliptical opening at the point where it engages the axle, so as to permit movement with relation to said axle.

25. A brake mechanism, comprising a fixed part on the axle, an opposed frictional element, a stop associated with said axle, two parts interposed between said frictional element and said stop, said parts connected together, a spring device between the parts at this connection, and means for separating the parts so as to move the frictional element.

26. A brake mechanism, comprising a fixed element on the axle, a frictional element opposed thereto, a stop on said axle, two parts interposed between said frictional element and said stop, one of said parts connected at two points either with the frictional element or stop, or some part associated therewith, and at two differently-located points with said other part, said four points of connection being substantially ninety degrees apart and adapted to permit a rocking motion of the movable parts to compensate for irregularities in the devices between which they are interposed, an actuating device for separating said two parts, a plunger associated with one part and bearing against the other, a cam engaging said plunger and adapted to move it to separate the parts, a telescopic connecting-link between said cam and a controlling device on the vehicle-body, said link connected to said parts at each end by a universal connection.

27. A brake for cars, comprising a friction device on the axle, an operating device on the car-body, a rotatable rod adjustable longitudinally, interposed between the operating device and the friction device, the rotation of said rod actuating the friction device.

28. A brake for cars, comprising a friction device on the axle, an operating device on the car-body, a rotatable telescopic two-part rod interposed between the operating device and the friction device, one part being connected with the friction device and the other part with the operating device on the car, the rotation of said rod actuating the friction device.

29. The combination with a car and its brake, of independent trucks pivotally supporting the ends of the car, a brake-operating friction-clutch upon one axle, clutch-operating devices supported by the truck, a pivoted lever supported from the car near said axle, means whereby a brakeman at the end of the car may swing said lever, at will, and connections of automatically-adjustable length transmitting the rotary motion of the lever to said devices, whereby said devices are operated regardless of relative swinging of the truck.

30. The combination of a car and its truck, of a brake-operating friction-clutch upon one truck-axle, devices supported by the truck alone, for throwing the clutch into engagement, a sleeve mounted in a bearing supported from the car and adapted to both swing and rotate, a bar sliding but not rotating in said sleeve, means whereby the rotation of the bar actuates said devices, and means whereby said sleeve may be rotated from either end of the car.

31. The combination with a car and its truck, of a brake-operating friction-clutch upon one of the axles, a brake-staff at the end of the car, a sleeve adapted to swing and to rotate and mounted in a bearing supported
5 by the car alone, a bar sliding but not rotating in said sleeve, means whereby said sleeve and bar may be rotated by the movement of the brake-staff, and means whereby the rotation of the bar throws said clutch into engagement.

WILLIAM G. PRICE.

Witnesses:
AUGUSTUS SCHEPMOES,
JOHN W. SEARING.